United States Patent [19]

Rutigliano

[11] Patent Number: 5,886,431
[45] Date of Patent: Mar. 23, 1999

[54] CIRCUIT AND METHOD OF OPERATION TO CONTROL IN-RUSH CURRENT FROM A POWER SUPPLY TO PERIPHERAL DEVICES IN AN INFORMATION SYSTEM

[75] Inventor: Jeffrey Paul Rutigliano, Raleigh, N.C.

[73] Assignee: International Business Machines Corporation, Armonk, N.Y.

[21] Appl. No.: 935,781

[22] Filed: Sep. 23, 1997

[51] Int. Cl.⁶ .................................................. H02H 9/02
[52] U.S. Cl. ........................... 307/131; 323/908; 361/58; 395/283; 439/924.1
[58] Field of Search .................................. 307/119, 116, 307/146, 131; 361/58, 9; 395/283; 323/908; 439/924.1

[56] References Cited

U.S. PATENT DOCUMENTS

| | | | |
|---|---|---|---|
| 5,032,968 | 7/1991 | Mikami et al. | 363/37 |
| 5,087,871 | 2/1992 | Losel | 323/908 |
| 5,187,653 | 2/1993 | Lorenz | 363/89 |
| 5,210,855 | 5/1993 | Bartol | 395/500 |
| 5,268,592 | 12/1993 | Bellamy et al. | 307/43 |
| 5,272,584 | 12/1993 | Austruy et al. | 361/58 |
| 5,376,831 | 12/1994 | Chen | 327/379 |
| 5,383,081 | 1/1995 | Nishikawa | 361/58 |
| 5,432,916 | 7/1995 | Hahn et al. | 395/283 |
| 5,473,499 | 12/1995 | Weir | 361/58 |
| 5,572,395 | 11/1996 | Rasums et al. | 361/9 |
| 5,675,467 | 10/1997 | Nishimura et al. | 361/58 |

OTHER PUBLICATIONS

IBM Technical Disclosure Bulletin, vol.34, No. 8, Jan. 1992, pp.52–54, entitled "Power supply Inrush Current–Limiting Circuit".

IBM Technical Disclosure Bulletin, vol. 36, No. 10, Oct. 1993, pp.335–340, entitled "Secondary Power Distribution Source for Point–of Sale Systems".

IBM Technical Disclosure Bulletin, vol. 32, No. 9B, Feb. 1990, pp.424–429, entitled "Hot–Plug Protection Circuit".

IBM Technical Disclosure Bulletin, vol. 24, No. 3, Aug. 1981, pp.1441–1442, entitled "Buck Converter with Switch Referenced to Ground".

IBM Technical Disclosure Bulletin, vol. 25, No. 2, Jul. 1982, p.470, entitled "Power Supply Inrush Current Limiter/Clamp Circuit".

Primary Examiner—Albert W. Paladini
Attorney, Agent, or Firm—John D. Flynn; Morgan & Finnegan

[57] ABSTRACT

This apparatus and method controls and limits the flow of in-rush current to a peripheral device coupled to a main power supply unit through a power bus and a ground bus. The apparatus and method essentially isolate and limit in-rush current flow to a capacitive load until operational current flow occurs to the peripheral device. A switching device is coupled to the power bus and the ground bus through a load. A resistive device is coupled to the power bus and the ground bus through the load. A control circuit is connected to the switching device. During initial start-up or "hot plugging" of the device, the control circuit turns "off" the switching device causing the load to be charged from the power bus through the resistive device until a predetermined condition occurs whereupon the switching circuit is turned "on" to bypass the resistive device and connect the load and the peripheral device to the power bus. Optionally, a unidirectional device may be connected between the power bus and the load to serve as a fail-charge/discharge path to the device in the event the switching device and/or the control circuit should fail. The apparatus and method provide current limiting at power up without requiring the switching component to handle all operational current at all times. Further the apparatus and method allow operation of the device should the switching and/or the control circuit fail.

9 Claims, 2 Drawing Sheets

CIRCUIT AND METHOD OF OPERATION TO CONTROL IN-RUSH CURRENT FROM A POWER SUPPLY TO PERIPHERAL DEVICES IN AN INFORMATION SYSTEM

BACKGROUND OF THE INVENTION

1. Field of the Invention

This invention relates to information processing systems. More particularly, the invention relates to power supplied buses for peripheral devices coupled to such systems in which in-rush current is limited to such peripheral devices after power-up or "hot plugging".

2. Background Discussion

In information processing systems where a power supply provides operating current to peripheral devices, two events can occur where a significant amount of current can flow to the peripheral device from the supply. These high currents may damage components in the power supply and also place a great deal of stress on the cable system and connector linking the peripheral device to the power supply.

One event for high current flow occurs in doing power-up of the system. The second event occurs when a peripheral device is plugged-in to the system which is already turned on, commonly referred to as "hot plugging". The high current flow is due, in part, at least to the pre-charging of capacitors in the peripheral device. The prior art has dealt with this problem by introducing current-limiting devices such as current-limiting resistors and switches that provide a lower resistance path in parallel with the current-limiting resistors. Prior art related to power-up or "hot plugging" of peripheral devices is as follows:

U.S. Pat. No. 5,187,653 discloses a current-limiting circuit able to react to in-rush current surges during start-up. A current monitoring control circuit activates a bypass switch "on" and "off" to assure that excessive current is not allowed to go around a current limiter.

U.S. Pat. No. 5,376,831 issued Dec. 27, 1994, discloses a circuit switch which prevents current surges during initial power applications or during hot-plugging. The circuit includes a switch and transistor in parallel with a resistor combination in series with a capacitor. The circuit controllably supplies initial current from a power supply to a load to prevent a current surge when the switch is hot-plugged or when power is first applied to the switch circuit. A timer changes the voltage across an output transistor to begin a limited conduction of current. The current increases in a controllable manner until the output transistor is turned "on" full to supply operating current to the peripheral device.

All of the prior art disclose places the current-limiting resistors and switches in the main path supplying power to the peripheral device which increases the amount of power required for the peripheral device as well as lowering the efficiency of the peripheral device during normal operation.

SUMMARY OF THE INVENTION

An object of the invention is a circuit and method of operation to control the flow of energy to a peripheral device during start up or "hot plugging" without affecting the efficiency of the peripheral device during normal operation.

Another object is a circuit and method of operation for bypassing power supply current to peripheral device through a charging circuit until the charging circuit voltage approaches the power supply voltage whereupon the power supply current is directly connected to the peripheral device.

Another object is a circuit and method of operation for operating a switching device to bypass current from a power supply to a peripheral device until a predetermined condition occurs, whereupon the switching circuit operates to connect the power supply directly to the peripheral device.

Another object is a switchable bypass circuit for a power supply such that a failure of the switching device will allow the power supply to supply current to a peripheral device through an alternate path.

These and other objects, features and advantages are achieved in a circuit and method which controls and limits the flow of in-rush current to a peripheral device coupled to a main power supply through a power bus and a ground bus. The circuit and method essentially isolate and limit in-rush current flow to a capacitor load of a peripheral device until the voltage across the load approaches voltage across the power supply. A switching device is coupled to the power bus and the ground bus through a capacitive load. A resistive device is coupled to the power bus and the ground bus through the load. A control circuit is connected to the switching device. During initial start-up or "hot plugging" of the peripheral device, the control circuit turns "off" the switching device causing the capacitive load to be charged from the power bus through a resistive device until a predetermined condition occurs whereupon the switching device is turned "on" to bypass the resistive device and connect the load and peripheral device directly to the power bus. Optionally, a uni-directional device may be connected between the power bus and the load to serve as a fail-charge/discharge path to the peripheral device in the event the switching device and/or the control circuit should fail to operate. The circuit and method of operation are installed and operate in the peripheral device contrary to the prior art in locating the current-limiting circuit in the main power delivery path.

DESCRIPTION OF THE FIGURES

The invention will be more fully understood from the following detailed description of the preferred embodiment taken in conjunction with the appended drawings, in which.

DESCRIPTION OF THE PREFERRED EMBODIMENT

Figure 1:
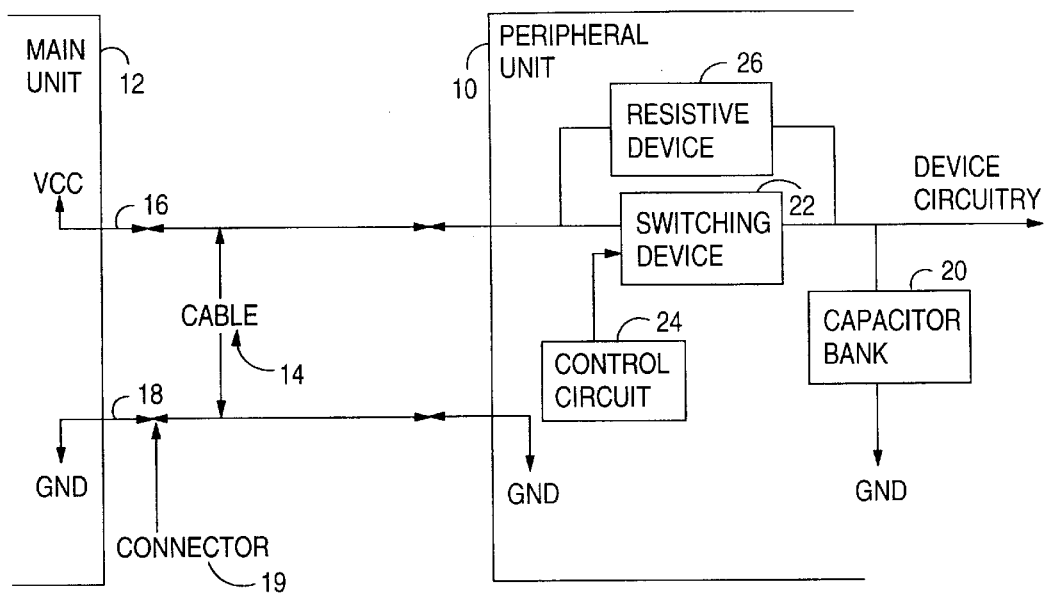
FIG. 1 is a circuit diagram of a prior art circuit.

FIG. 1 is a typical prior art circuit for limiting in-rush current to a peripheral device 10 from a power supply unit 12 at start-up or "hot plugging" of the device 10. In FIG. 1, the power supply 12 provides power to the peripheral unit 10 through a cable 14 which interconnects a power rail 16 and ground rail 18 of the unit 12 and device 10 through connectors 19. On start-up or "hot plugging" of the device 12, a capacitive load 20 associated with the device 10 is in a discharge state and requires charging to reach a voltage level of the power rail in order for the device 10 to function. In so doing, the capacitive load appears as a short circuit and a large in-rush current flows, which in the absence of current-limiting devices places a stress on the cable and connectors and may also damage components of the unit 12. The switching device 22 is operated by a control circuit 24 to direct the in-rush current through a resistor 26 to charge the capacitor bank 20. The reduced in-rush current lessens the cable stress and prevents damage to components in the unit 12. After charging, the control circuit operates the switching device to bypass the resistive device 26 and connect the power rail of the supply through the switching device to the peripheral. A disadvantage of the prior art circuit is that the switching device 22 must carry the operational current of the peripheral at all times. In high power applications, the device 22 presents a reliability and cooling concern. Another problem is presented when the switching device or control circuit fails. In such cases, all power consumed by the device 10 would have to pass through the resistive device 26 which could reduce the current supply to the peripheral to the point that the peripheral would not function or function at reduced efficiency.

Figure 2:
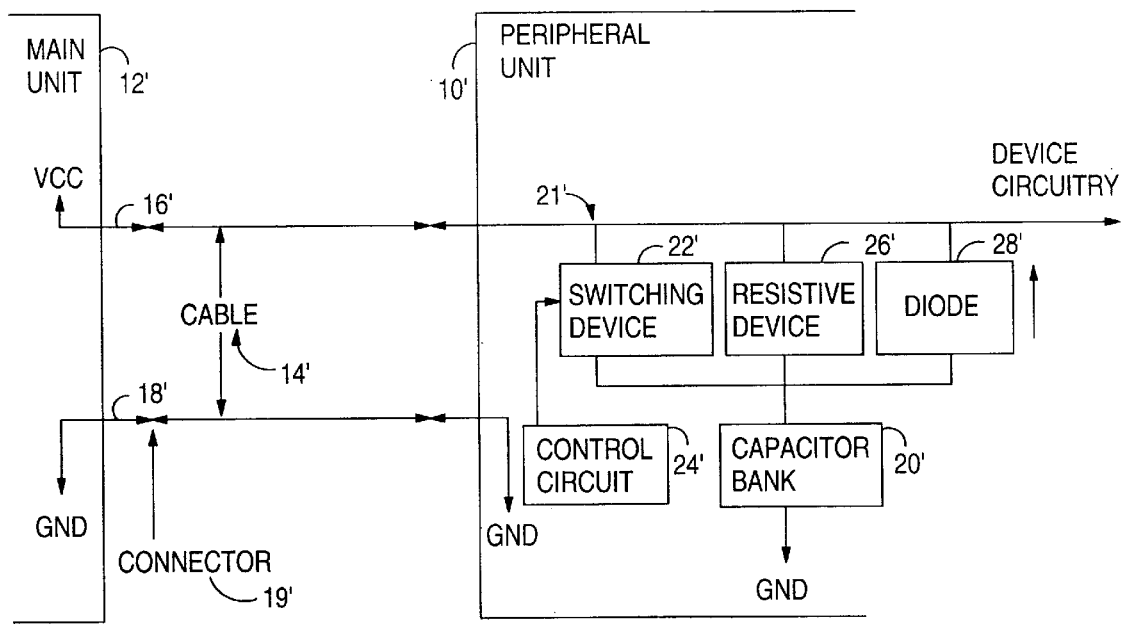
FIG. 2 is a circuit diagram of a current-limiting circuit incorporating the principles of the present invention.

FIG. 2 overcomes the limitations of the prior art in that the current-limiting features at power-up do not require the switching component to handle all operation of current at all times. Also, FIG. 2 allows the peripheral device to function after the switching device or the control circuit fail.

In FIG. 2, the circuit elements have the same reference character assignment, as in FIG. 1, except they include a "prime" mark. In FIG. 2, the switching device 22' and resistive device 26' are removed from the main power bus 16' and placed between the capacitor bank 20' and the power bus 16'. During the initial moments after power-up or "hot plugging" or other events which can cause high initial current flow, a bypass circuit 21 is opened when the switching device 22' is turned off and power supply current flows through the resistive element 26' to allow pre-charge of the capacitor bank 20'. The resistive device limits the amount of current flow while the capacitance in the peripheral device charges up. The resistive device may be a simple resistor or a resistor with a Positive Temperature Coefficient (PTC). As the in-rush current flows due to the difference in voltage in the power supply and the voltage on the capacitors, the switching element determines the periods when the high current flow begins to diminish. At that time the bypass circuit is closed when the switching element is operated by the control circuit to directly link the capacitor bank to the power rail 16' through the switching device 22'. In one embodiment, the control circuit monitors the voltage on the capacitor bank and switches the device 22 when the capacitor bank is sufficiently charged. In another embodiment, the control circuit may use a predetermined delay calculated to allow the capacitor to charge up sufficiently during the delay. Having the switching element in a parallel bypass circuit instead of in series with the power supply as in the prior art, enables the switching element in the bypass path to be of smaller capacity and conduct less power supply current during charging of the capacitive load. The bypass path including the switching device also form a low impedance charge/discharge path between the capacitor bank and the power rail 16 after charge up of the capacitive bank. The discharge path can be augmented by a diode 28 connected between the bank and the power rail in the event the switching device or the control circuit should fail and the bypass path be open circuited. In this condition, the capacitor bank can be charged through the resistor as the high current from the capacitor is supplied to the peripheral device via a highly reliable path through the diode 28. In such case, the device 10 may be able to function for a limited time until repairs can be made while the capacitor is being charged through the resistor.

Figure 3:
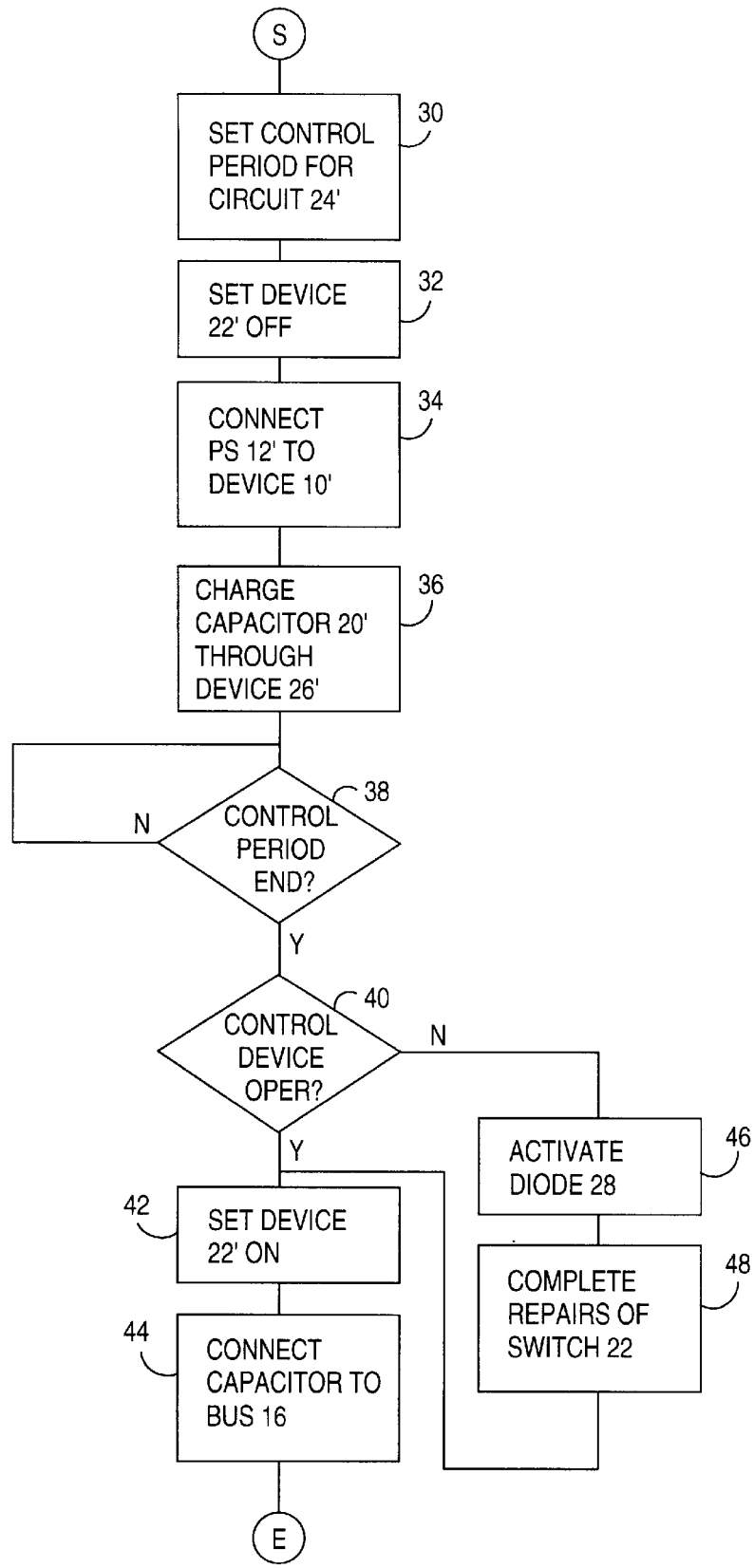
FIG. 3 is a flow diagram describing the operation of the circuit of FIG. 2 and limiting in-rush current to peripheral devices during start-up or in hot-plugging.

The operation of the circuit 21 for controlling in-rush current to the device 10' will be described in conjunction with FIGS. 2 and 3. In a step 30, a control period is determined for switching the device 22' between an "off" and "on" state. The control period may be calculated based on the voltage level achieved for the capacitor bank or a time period for charging the capacitor based upon the resistance and capacitance of the devices 20 and 26. The control period is set into the control circuit 24'. In a step 32, the bypass circuit 21 is disabled when the switching device 22 is turned "off" prior to connecting the power supply 12' to the device 10' in a step 34. The capacitor bank 20' is charged through the resistive device 26' in a step 36. The control circuit 24' monitors the voltage level of the capacitor bank or the time period for charging the capacitor bank as the case may be in a test 38. In a "no" condition, the monitoring state of the control circuit 24' continues. A "yes" condition initiates a test 40 to determine if the switching device 22' is operative. A "yes" condition activates the bypass circuit when the device 22 switches to an "on" condition in a step 42 and connects the capacitor directly to the power bus 16 through the bypass circuit including the switching device 22 in a step 44. The charged state of the capacitor bank through the low impedance bypass path including the switching device activates the device 10 for operation and the process ends. Returning to step test 40, a "no" condition initiates a step 46 which activates a diode 28 which supplies current from the capacitor bank 20 to the peripheral device as the capacitor bank charges through the resistive device 26'. The energy storage capacity of the capacitor and the impedance of the resistive element enable the peripheral device to function in a limited function mode until repairs can be made. In a step 48, repairs are made to the switching device or control circuit, as the case may be, after which the process returns to step 42 for connecting the capacitor directly to the bus 16 through the bypass circuit.

Summarizing, the present invention allows a highly capacitive mode to be "hot plugged" without a high initial current surge. This feature has particular significance as standard interfaces are being developed which specify "hot plugging" as a requirement. The invention charges a highly capacitive load while controlling the energy flow into the capacitor through a series resistor until a predetermined voltage level is achieved by the capacitor bank or a predetermined time occurs whereupon a switch bypasses the resistor to directly connect the capacitor load to the power bus through a low impedance bypass path including a switching device. The Low impedance bypass paths can be augmented by a diode for supplying current around the switching device should it be inoperative or a control circuit associated therewith fail. The augmented low resistance path enables a capacitor bank to supply current to the peripheral device until repairs can be made to the switch.

While the invention has been described in conjunction with a specific embodiment, modifications can be made therein without departing from the spirit and scope of the invention as defined in the appended claims, in which:

I claim:

1. In a peripheral device coupled to a main power supply unit through a power bus and a ground bus for receiving line current from the main power supply unit, a surge protection circuit for limiting in-rush current during initial start up or "hot-plugging" of the device, comprising:

a) means for directly connecting the main power supply and the peripheral device through the power bus and the ground bus without intervening impedance elements therebetween;

b) a switching device connected to the power bus and to the ground bus through a load for sinking the in-rush current;

c) a resistive device coupled to the power bus and to the ground bus through the load; and d) a control circuit coupled to the switching circuit whereby during initial start-up or "hot plugging" of the device, the control circuit turns "off" the switching device causing the load to be charged from the power bus through the resistive device until the in-rush current to the load terminates whereupon the control circuit turns "on" the switching circuit to bypass the resistive device and supply the line current directly to the peripheral device.

2. The surge protection circuit of claim 1 further comprising:
   a) a uni-directional device connected between the power bus and the load for discharging the load in the event the switching device or control circuit should fail to operate.

3. The surge protection circuit of claim 1 further comprising:
   a) means included in the control circuit for monitoring the voltage difference between the load and the main power supply.

4. The surge protection circuit of claim 1 further comprising:
   a) means included in the control circuit for turning "on" the switching device after a pre-determined period of in-rush current flow.

5. The surge protection circuit of claim 2 further comprising:
   a) means for supplying initial start up or "hot plug" current from the main supply unit to the uni-directional device as a charge path for the peripheral device when the switching device and/or control circuit has failed.

6. In a peripheral device directly coupled to a main power supply unit through a power bus and a ground bus for receiving operating current from the main power supply unit, a switching device coupled to the power bus and the ground bus through a load for receiving in-rush current; a resistive device coupled to the power bus and the ground bus through the load and a control circuit connected to the switching device, a method for limiting in-rush current during initial start up and "hot plugging" of the peripheral device, comprising the steps of:
   a) supplying the in-rush current from the main power supply unit to the peripheral device during initial start up or "hot plugging" thereof;
   b) detecting the in-rush current in the control circuit and operating the switching device to place the switching device in an open or off state;
   c) directing the in-rush current to the load through the resistive device;
   d) monitoring the in-rush current for a pre-determined condition; and
   e) returning the switching device to a "closed" or "on" state upon expiration of the pre-determined condition whereupon the resistive element is bypassed and the the main power supply unit directly supplies operating current to the peripheral device.

7. The method of claim 6 further comprising the step of:
   a) providing a charge/discharge path to the peripheral device upon the failure of the control circuit and/or the switching device.

8. The method of claim 6 further comprising the step of:
   a) monitoring the power supply output voltage and the load input voltage to determine when the switching device should be placed in an "on" condition or an "off" condition.

9. The method of claim 6 further comprising the step of:
   a) operating the switching device after a pre-determined period of in-rush current flow to place the switching device in an "on" condition.

* * * * *